June 6, 1961 P. CHAROS 2,987,301
ROLLER MIXER FREEZER
Filed June 3, 1958 2 Sheets-Sheet 1

INVENTOR.
PETER CHAROS
BY Henry J. E. Metzler
ATTORNEY.

June 6, 1961 P. CHAROS 2,987,301
ROLLER MIXER FREEZER
Filed June 3, 1958 2 Sheets-Sheet 2
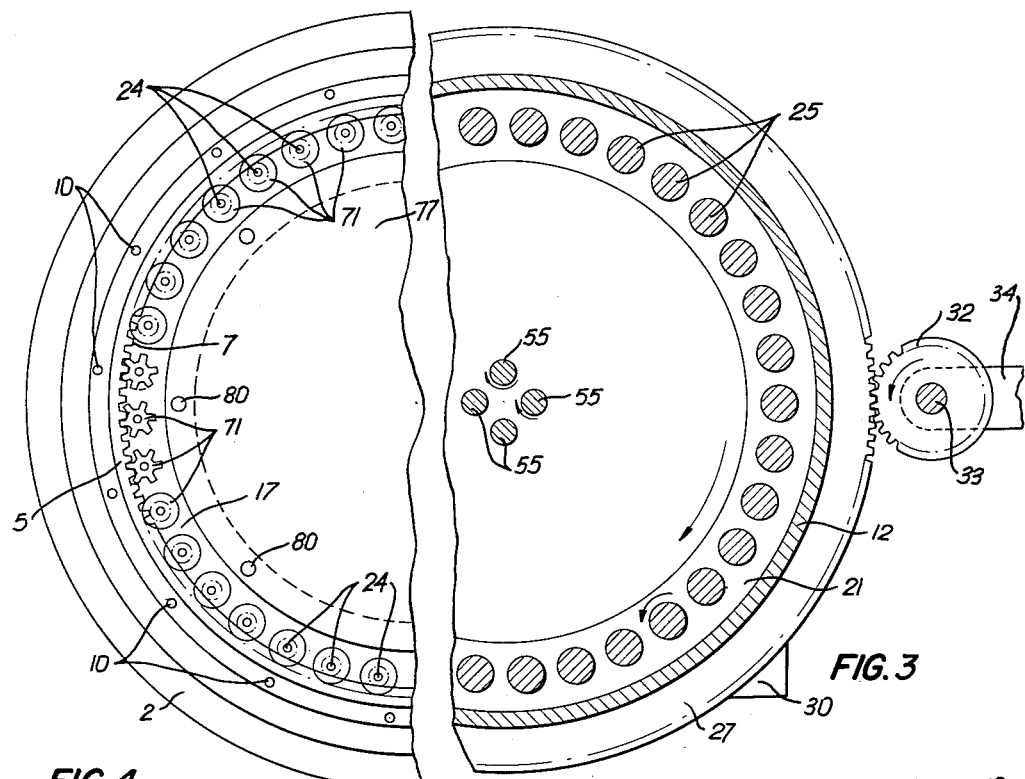
FIG. 4
FIG. 3
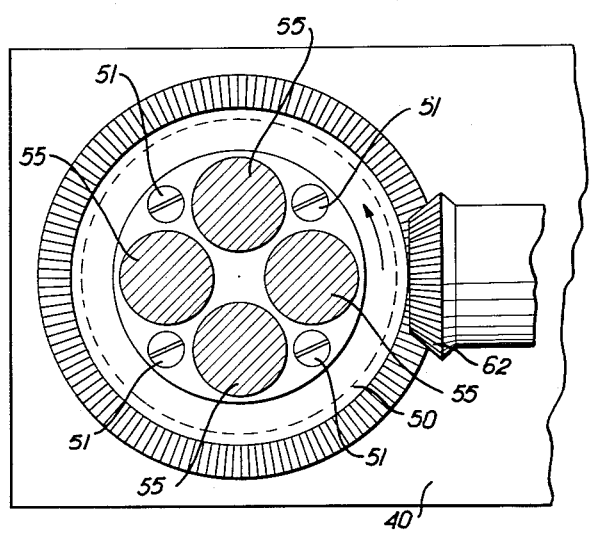
FIG. 5
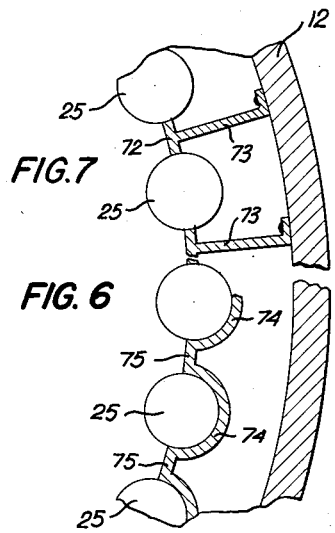
FIG. 7
FIG. 6
INVENTOR.
PETER CHAROS
BY Henry J. S. Metzler
ATTORNEY.

2,987,301
Patented June 6, 1961

2,987,301
ROLLER MIXER FREEZER
Peter Charos, Maylen Drive, Hampton Bays, N.Y.
Filed June 3, 1958, Ser. No. 739,517
2 Claims. (Cl. 259—32)

The present invention relates to improvements in freezing and mixing devices and, more specifically, it relates to a mechanical device which is designed for utilizing a new method of making ice cream or other frozen products.

One object of the present invention is the provision of a device of the character described which facilitates the making of ice cream and other frozen products, so that the same can be made more rapidly and that a finished product can be attained which is of a higher and more improved quality than hitherto has been possible to attain with any other device or method.

Another object of the present invention is the provision of a device of the character described which can be used for freezing and mixing various products according to different formulas consecutively without necessarily washing or cleaning the device after each freezing and mixing process of a product.

A further object of the present invention is the provision of a device of the character described which can be dismantled and cleaned easily, which is compact, simple in construction, reliable in use, quick and easy to empty and to re-fill, easy to operate, and which is also sturdy, durable and well adapted for withstanding the rough usage to which devices of this type ordinarily are subjected.

With the foregoing and other objects in view which will appear as the description proceeds, the invention consists of certain novel details of construction and combinations of parts hereinafter more fully described and pointed out in the claims, it being understood that changes may be made in the construction and arrangements of parts without departing from the spirit of the invention as claimed.

In the accompanying drawings a preferred form of the invention has been shown.

In said drawings:

FIG. 3 is a fractional sectional view on the line 3—3 of FIG. 2;

FIG. 4 is a fractional sectional view on the line 4—4 of FIG. 2;

FIG. 5 is an enlarged fractional sectional view on the line 5—5 of FIG. 2;

FIG. 6 is an enlarged fractional cross-sectional portion showing details of a scraping blade arrangement; and FIG. 7 is an enlarged fractional cross-sectional portion like FIG. 6, showing details of a modified scraping means arrangement.

Similar reference characters refer to similar parts throughout the several views.

Figure 1:
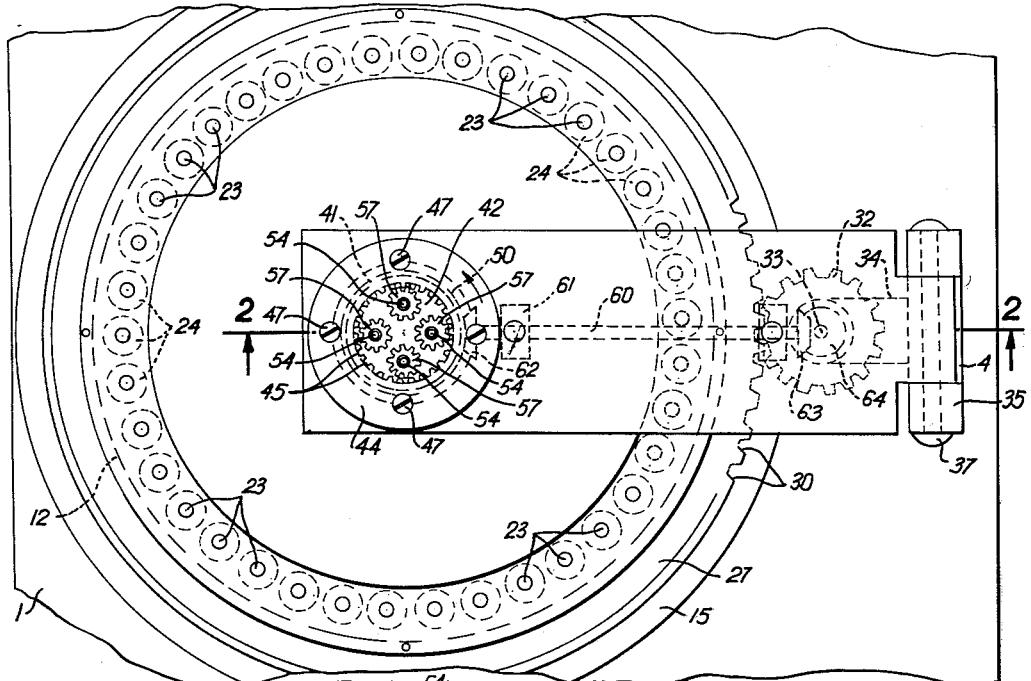
FIGURE 1 is a top plan view of a preferred embodiment of my invention.

In the drawings the numeral 1 denotes a base which has an opening as shown in the drawing. On the portion of said base which surrounds said opening are mounted a ball bearing member 2, a ring member 3 and a bracket 4. A first annular member 5, which is provided with internal teeth 7, is secured to the member 3 by means of screws 10, which are extended through the member 3 into the base 1. An upright cylindrical member of a receptacle 12 has a lower outwardly extended annular flange portion 15, which rests upon the bearing member 2, and a second annular member 17 is secured to the lower end of the member 12 by means of screws 20 or the like and rests with its outer periphery against the bearing member 2.

A third annular member 21 is secured to the top of the member 12 by means of screws 22 or the like.

The annular members 17 and 21 have a circular row of registering holes through which are extended shaft portions 23 and 24 of first upright rollers 25. The first upright rollers 25, which can be made of any suitable material, are rotatable in the cylindrical member 12 in a direction which is opposite to the direction in which the member 12 itself rotates. The rollers 25 preferably are refrigerated by any suitable means, for instance by making them hollow and making them so that their interior is accessible, and by inserting thereinto a refrigerant such as Dry Ice or the like. A fourth annular member 27, which has external teeth 30, is secured to the outer side of the member 12 by means of screws 31 or the like. A toothed pinion 32, which engages the teeth 30 of the member 27, is secured to an upright driving shaft 33, which is rotatably extended through lugs 34 as well as through the base 1. The lugs 34 extend laterally from the bracket member 4 and are secured thereto, or are made as a unit therewith, and any suitable source of power beneath the base 1, such as an electric motor (not shown) turns the shaft 33.

Figure 2:
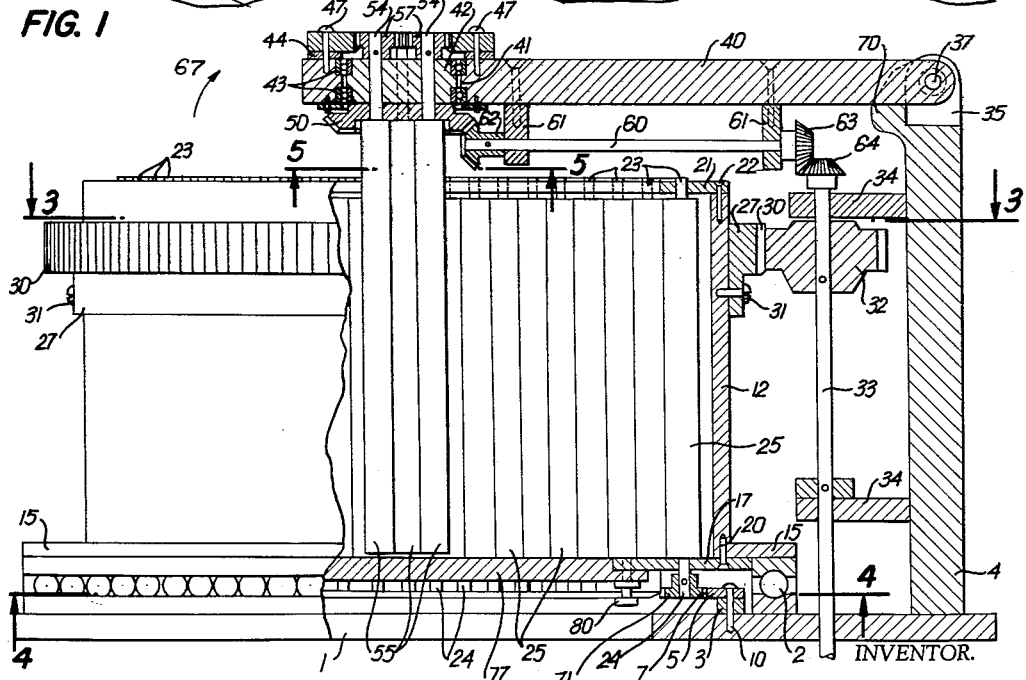
FIG. 2 is a side elevation, partially in section on the line 2—2 of FIG. 1.

The bracket member 4 has a bifurcated upper portion 35, to which is pivoted at 37 an arm 40 that has a circular opening 41. A disk 42 is rotatable in the opening 41 and is attached to those portions of the arm 40 which surround the opening 41 by means of ball bearings 43 or the like. A fifth annular member 44 which has internal teeth 45, is secured to the upper side of the arm 40 around the opening 41 by means of screws 47 or the like, and a bevel gear wheel 50 is secured to the lower side of the disk 42 by means of screws 51 or the like (FIG. 2). Shaft portions 54 of a plurality of upright second rollers 55, which may be the same as the upright rollers 25, are rotatably extended through the disk 42, and a gear wheel 57 is secured to that section of each shaft portion 54 which protrudes beyond the upper side of the disk 42. Thus the second rollers 55 extend into a space encompassed by the first rollers 25 within the cylindrical member 12. The gear wheels 57 engage the teeth 45 of the member 44. A shaft 60 is rotatably extended through lugs 61, which are secured to the lower side of the arm 40, and bevel gear wheels 62 and 63 are secured to the respective ends of the shaft 60 or are made as a unit therewith. Another bevel gear wheel 64 secured to the upper end of the shaft 33, or made as a unit therewith as shown, engages the wheel 63, while the wheel 62 engages the wheel 50.

The arm 40 can be swung on the pivot 37, so that the second rollers 55 can be taken out of the member 12 by swinging the arm 40 in the clockwise direction of the arrow 67 (FIG. 2).

When the arm 40 is in the horizontal position shown in FIGS. 1 and 2, a portion of it rests against a stop 70 laterally extended from the bracket member 4, and in this position the wheels 63 and 64 are in engagement with each other.

A toothed pinion 71 is secured to each shaft portion 24 of each first roller 25 and engages the teeth 7 of the member 5. A bottom plate 77 is removably attached to the member 17 by means of knurled set screws 80 or the like.

Upon rotation of the shaft 33, the pinion 32, engaging the teeth 30 of the member 27 causes a rotation of the member 12, and the bevel gear wheel 64, engaging the wheel 63 causes a rotation of the shaft 60. Thereby the pinions 71, which engage the teeth 7 of the stationary member 5, cause the rollers 25 to rotate in a direction which is opposite to the direction of rotation of the member 12, and the gearwheel 62, which engages the bevel gear wheel 50, causes a rotation of the bevel gear 50 as well as of the disk 42, so that the wheels 57, engaging the teeth 45 of the stationary member 44, cause the second rollers 55 to rotate in a direction which is opposite to the direction of rotation of the disk 42 on the wheel 50. In the instance shown, the members 12 and 55 rotate in a clock-wise direction, as is indicated by the arrows in FIG. 3, whereas the elements 42 and 50 rotate in a counter-clockwise direction, as indicated by the large arrow near the element 50 in FIG. 5.

I also prefer to provide any suitable stationary scraping members along and between the rollers 25 and 55. I prefer to use in each device two different types of scraping members such as scraping blades 72 which are welded or otherwise secured to angular members 73, that are attached to the inner side of the member 12; and semi-circular scraping members 74 having inter-connecting flange portions 75.

The finished product can be removed easily and quickly by opening the bottom plate 77 and allowing the contents of the member 12 to drop out of the same and through an opening in the base 1, which opening is approximately of the same size as the bottom plate 77, as may be seen in FIG. 2. Thereupon a new load of material can be inserted after the arm 40 has been moved into a vertical position.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. A freezing and mixing device comprising a base, a receptacle having side walls as well as a bottom which has an open portion and also having a lower flange portion, bearing means on said base rotatably supporting thereon the flange portion of said receptacle, removable means for closing the open portion of said bottom, a first stationary gear member mounted on said base, a plurality of first rollers rotatably mounted within said receptacle along its side walls, a gear wheel connected to each one of said first rollers engaging said first stationary gear member, a horizontal arm pivotally mounted above said receptacle being adapted to be moved temporarily into a vertical position, a disk rotatably mounted on said arm, a plurality of second rollers rotatably mounted on said disk and extending into the center of said receptacle when said arm is in a horizontal position, a second stationary gear member mounted on said arm, a gear wheel connected to each one of said second rollers engaging said second stationary gear member, and means for rotating said receptacle and said disk.

2. A device of the character described comprising a base provided with an opening, bearing means provided on those portions of said base which surround said opening, an upright cylindrical member having a bottom provided with an opening in registering alignment with the opening in said base and having also a lower flange portion rotatably supported by said bearing means, a closure member removably mounted to portions of said bottom encompassing the opening thereof, an annular member provided with internal teeth being mounted on said base intermediate its opening and said bearing means, a plurality of upright first rollers rotatably mounted on the inner side of said cylindrical member, pinions mounted on the lower ends of said first rollers engaging the teeth of said annular member, a plurality of upright second rollers extended into a space between said first rollers within said cylindrical member, means for swinging said second rollers as a unit out of and into said cylindrical member, scraping blades provided between each pair of said first rollers, angular members mounted on said scraping blades being fastened to the inner side of said cylindrical member, and means for rotating said cylindrical member and said second rollers as a unit in a predetermined direction thereby causing said first rollers, through the engaging of said pinions with said annular member, to rotate in a direction which is opposite to the direction of rotation of said second rollers.

References Cited in the file of this patent

UNITED STATES PATENTS

| | | |
|---|---|---|
| 230,856 | Barthwick | Aug. 10, 1880 |
| 471,337 | Humphreys | Mar. 22, 1892 |
| 939,512 | Jones | Nov. 9, 1909 |
| 1,663,830 | Eirich et al. | Mar. 27, 1928 |
| 2,191,739 | Bean | Feb. 27, 1940 |
| 2,237,859 | Bille | Apr. 8, 1941 |
| 2,438,465 | Strauss et al. | Mar. 23, 1948 |
| 2,808,239 | Reiffen | Oct. 1, 1957 |